(12) United States Patent
Lee et al.

(10) Patent No.: US 10,326,366 B2
(45) Date of Patent: *Jun. 18, 2019

(54) ZERO-VOLTAGE SWITCH-MODE POWER CONVERTER

(71) Applicant: Ferric Inc., New York, NY (US)

(72) Inventors: William Lee, New York, NY (US); David Jew, New York, NY (US); Joseph Meyer, New York, NY (US); Noah Sturcken, New York, NY (US)

(73) Assignee: Ferric Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,726

(22) Filed: Jan. 12, 2018

(65) Prior Publication Data

US 2018/0145592 A1  May 24, 2018

Related U.S. Application Data

(63) Continuation of application No. 15/243,022, filed on Aug. 22, 2016, now Pat. No. 9,906,131.

(51) Int. Cl.
*H02M 3/158* (2006.01)
*H02M 3/157* (2006.01)
*H02M 1/38* (2007.01)
*H02M 1/00* (2006.01)

(52) U.S. Cl.
CPC ............. *H02M 3/158* (2013.01); *H02M 1/38* (2013.01); *H02M 3/157* (2013.01); *H02M 3/1588* (2013.01); *H02M 2001/0058* (2013.01); *Y02B 70/1466* (2013.01); *Y02B 70/1491* (2013.01)

(58) Field of Classification Search
CPC ......... H02M 2001/0058; H02M 3/156; H02M 3/157; H02M 3/158; H02M 3/1588; Y02B 70/1491
See application file for complete search history.

(56) References Cited

U.S. PATENT DOCUMENTS

| | | | |
|---|---|---|---|
| 9,906,131 B1 * | 2/2018 | Lee ................. | H02M 3/158 |
| 2001/0036085 A1 | 11/2001 | Narita | |
| 2005/0184716 A1 * | 8/2005 | Brown .............. | H02M 1/38 |
| | | | 323/283 |
| 2006/0007713 A1 * | 1/2006 | Brown .............. | H02M 3/1588 |
| | | | 363/17 |

(Continued)

*Primary Examiner* — Fred E Finch, III
(74) *Attorney, Agent, or Firm* — Intrinsic Law Corp.

(57) ABSTRACT

A switched-mode power converter includes timing control feedback loop circuits to minimize or eliminate the potential difference across a high-power switch and a low-power switch during their transitions times. A first feedback circuit compares the measured voltage across the high-power switch at the moment the high-power switch closes with the input voltage to the high-power switch to control a low-to-high delay time. A second feedback circuit compares the measured voltage across the low-power switch at the moment the low-power switch closes with the input voltage to the low-power switch to control a high-to-low delay time. A third feedback circuit compares the measured voltage across the low-power switch at the moment the low-power switch opens. The output of the third feedback circuit is provided as inputs to the first and second feedback circuits. The third feedback circuit also controls the frequency of the power converter.

19 Claims, 6 Drawing Sheets

(56) References Cited

U.S. PATENT DOCUMENTS

| | | | |
|---|---|---|---|
| 2006/0043943 A1 | 3/2006 | Huang et al. | |
| 2006/0091871 A1* | 5/2006 | Abedinpour | H02M 3/158 323/283 |
| 2009/0160412 A1* | 6/2009 | Latham | H02M 3/1588 323/282 |
| 2009/0273957 A1* | 11/2009 | Feldtkeller | H02M 1/38 363/98 |
| 2010/0321041 A1* | 12/2010 | Feldtkeller | H02M 1/38 324/680 |
| 2012/0043950 A1* | 2/2012 | Truong | H02M 3/158 323/282 |
| 2012/0256671 A1 | 10/2012 | Xu et al. | |
| 2013/0057243 A1* | 3/2013 | Yang | G05F 5/00 323/301 |
| 2014/0077790 A1* | 3/2014 | Sohma | H02M 3/1588 323/313 |
| 2014/0152278 A1* | 6/2014 | Shepard | G06F 1/04 323/272 |
| 2015/0222193 A1* | 8/2015 | Zambetti | H02M 3/33546 363/21.02 |
| 2016/0380542 A1* | 12/2016 | Moon | G01R 19/04 323/235 |
| 2017/0019015 A1* | 1/2017 | Wibben | H02M 1/36 |
| 2017/0187284 A1* | 6/2017 | Vaidya | H02M 3/1588 |
| 2017/0302178 A1* | 10/2017 | Bandyopadhyay | H02M 3/158 |

* cited by examiner

ZERO-VOLTAGE SWITCH-MODE POWER CONVERTER

RELATED APPLICATIONS

This application is a continuation of and claims priority to U.S. patent application Ser. No. 15/243,022 entitled "Zero-Voltage Switch-Mode Power Converter", filed on Aug. 22, 2016, which is hereby incorporated by reference.

TECHNICAL FIELD

The present application generally relates to power conversion, in particular switch-mode power converters, and methods of operating same.

BACKGROUND

Switch-mode power converters are used in numerous electrical power conversion applications (AC-AC, AC-DC, DC-DC, high voltage, low voltage, etc.). These converters generally operate on the principle of using switches to periodically charge some energy reservoir (such as an inductor or capacitor) and then periodically discharge the energy reservoir in a manner that creates an electrical potential at the converter output that is different than the electrical potential supplied to the input of the power converter. Generally, it is attractive to reduce the amount of power that is expended in the conversion process to reduce the total cost of operation (electricity cost). Many applications would prefer if the power converter used little or no power to perform the electrical power conversion process (100% power conversion efficiency) and consequently the input power (Vin*Iin) and output power (Vout*Iout) would be identical, although the electrical potentials (voltage levels) would be different.

In order to reduce power converter component volumes and cost, switch-mode power converters may operate at higher switching frequencies, reducing the required capacity of the electrical energy reservoir required for a given power converter design. Modern commercial power converters operate at switching frequencies ranging from 100 KHz (or less) to 5 MHz. A significant reduction in power converter volume (relative to modern commercial solutions) can be achieved in a switching converter operating at switching frequencies 10×-100× faster (e.g., 10 MHz to 500 MHz), which allows for use of energy reservoirs that can be integrated closer to the power conversion circuitry. However, increased switching frequency reduces power conversion efficiency because additional energy is required to actuate power-FETs. Additionally, power-FET resistance is higher than normal during switch transitions (transition from open-to-close, or close-to-open), which increases thermal losses in the power-FET if an electric current passes through the power-FET during this transition period (i.e., transition conduction losses).

It would be desirable to have systems and/or methods that overcome one or more of the above-described problems.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

In an aspect, the invention is directed to a switch-mode power converter. The power converter includes a bridge node having a bridge voltage. The power converter also includes a first switch having a first input and a first output, the first input having a power converter input voltage, the first output electrically connected to the bridge node, the first switch having a closed state in which the first input is electrically connected to the first output and an open state in which the first input is not electrically connected to the first output. The power converter also includes a second switch having a second input and a second output, the second input electrically connected to the bridge node, the second output electrically connected to a second voltage, the second voltage lower than the power converter input voltage, the second switch having a closed state in which the second input is electrically connected to the second output and an open state in which the second input is not electrically connected to the second output. The power converter also includes a logic circuit in electrical communication with the first and second switches, the logic circuit controlling a respective state of the first and second switches such that the first switch is in the open state when the second switch is in the closed state and the second switch is in the open state when the first switch is in the closed state. The power converter also includes an LC circuit in electrical communication with the bridge node and a power converter load, the power converter load receiving an output current at a power converter output voltage, the power converter output voltage lower than the power converter input voltage. The power converter also includes a pulse width modulation (PWM) and frequency control circuit configured to control (a) a ratio of times that the first and second switches are in respective closed states to control the power converter output voltage (b) a switching frequency of the first and second switches. The power converter also includes a first delay feedback circuit configured to control a low-to-high delay time between an open time of said second switch and a close time of said first switch. The power converter also includes a second delay feedback circuit configured to control a high-to-low delay time between an open time of said first switch and a close time of said second switch.

In another aspect, the invention is directed to a method of operating a switch-mode power converter. The method includes controlling a duty cycle of first and second switches electrically connected to a bridge node to convert a power converter input voltage to a power converter output voltage. The first switch has a first input and a first output, the first input having a power converter input voltage, the first output electrically connected to a bridge node, the first switch having a closed state in which the first input is electrically connected to the first output and an open state in which the first input is not electrically connected to the first output. The second switch has a second input and a second output, the second input electrically connected to the bridge node, the second output electrically connected to a second voltage, the second voltage lower than the power converter input voltage, the second switch having a closed state in which the second input is electrically connected to the second output and an open state in which the second input is not electrically connected to the second output. The first switch is in the open state when the second switch is in the closed state and the second switch is in the open state when the first switch is in the closed state. The method also includes discharging the bridge node voltage during a high-to-lowdelay time between an open time of the first switch and a close time of the second switch so that the bridge node voltage equals the second voltage at an end of the high-to-low-delay time. The method also includes adjusting the high-to-low-delay time if the bridge node voltage does not equal the second voltage at the end of the high-to-low-delay time. The method also includes charging the bridge node voltage during a low-to-high-delay time between an open time of the second switch and a close time of the first switch so that the bridge node voltage equals the power converter input voltage at an end of the low-to-high-delay time. The method also includes adjusting the low-to-high-delay time if the bridge node voltage does not equal the power converter input voltage at the end of the low-to-high-delay time. The method also includes controlling a frequency of the first and second switches so that an inductor current of an LC circuit in electrical communication with the bridge node raises the bridge voltage to the power converter input voltage during the low-to-high-delay time. The utility of the methods described here is a reduction in the energy dissipated by periodic charging and discharging of unwanted capacitance that is present at the switching node of a switched-inductor power converter.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

Aspects of the invention improve conversion efficiency of switched-mode power converters, including high-switching-frequency power converters, by reducing "transition conduction losses." A collection of monitoring circuits (e.g., "sample and hold" circuits) and timing feedback control circuits are provided to control the relative transition times of the switches (e.g., power-FETs) to minimize (or eliminate) electrical current traveling through any switch during the switch transition (e.g., while closing a PFET or NFET). In an exemplary DC-DC power converter circuit, a Buck converter, the "rising" transition and "falling" transition can both be optimized in concert with the power converter switching frequency and duty cycle in order to minimize power losses while satisfying other requirements for the power converter.

For switch-mode circuits operating at frequencies exceeding 10 MHz, it is especially challenging to implement monitoring and actuation for a zero-voltage-switching implementation because the timing latency associated with these circuits becomes significant relative to power conversion period. For example, the "sample and hold" are too slow to be effective in the same clock cycle. This disclosure provides timing based feedback circuits to iteratively optimize the switch (e.g., power-FET) transition times in subsequent power conversion cycles. This technique assumes that the conditions of the load current (and consequently the inductor current) do not change significantly from one power conversion cycle to the next, which is a reasonable assumption when the power conversion cycle frequency is greater than 10 MHz and the power converter filter cutoff frequency is lower than the switching frequency.

The timing control feedback loop circuit is comprised of one or more "sample and hold" circuits that are electrically coupled to the switching nodes and power-FETs where zero voltage switching is desired. Each "sample and hold" circuit uses a switch to electrically couple the relevant circuit nodes to a sampling capacitor. At the end of a given switch transition, the switch that connects the sampling capacitor is opened, so that the power-FET source-to-drain voltage at the instant that the switch transition concludes is held on the sampling capacitor. The voltage present on the sampling capacitor is known to be proportional to the current that was traveling through the power-FET during the switch transition, from Ohm's law.

The information regarding power-FET current during the switch transition is passed to the respective timing feedback control circuit. In a single phase buck, boost, buck-boost or flyback converter implementation, with or without multiple interleaved phases operating synchronously, with zero-voltage-switching on the "rising" transition and on the "falling" transition of the power-FET, three "sample and hold" circuits can be used. The first "sample and hold" circuit samples the source-to-drain voltage of the low-side power FET at the instant when the FET closes (the "falling" transition at the switching node). The second "sample and hold" circuit samples the source-to-drain voltage of the high-side power-FET at the instant when the FET closes (the "rising" transition at the switching node). Both the first and second "sample and hold" circuits compare the sampled source-to-drain voltage and compare the value with the desired value, which is subsequently integrated and used to control relative transition times in subsequent power conversion cycles. For example, if the first "sample and hold" circuit samples a source-to-drain voltage of 10 mV as the low-side power-FET closes, this indicates that the low-side power-FET is closing too early (since the source of the low-side power-FET is connected to ground). The 10 mV voltage error will be integrated in the first "sample and hold" circuit, and the integrated potential will drive a delay line that increases the dead-time on the "falling" transition so that the low-side FET closes later (relative to the high-side FET opening) in order to achieve zero-voltage switching. In a scenario where the sampled voltage from first 'sample and hold' circuit is −10 mV, the feedback control circuit will reduce the "dead-time" on the "falling" transition so that the zero-voltage switching is achieved.

The function of the second "sample and hold" circuit is similar to the first "sample and hold" circuit, except it affects the dead-time on the "rising" transition to achieve zero-voltage switching as the high-side power-FET closes.

The third "sample and hold" circuit samples the source-to-drain voltage that develops across the low-side power-FET at the instant when that FET opens. This voltage is proportional to the inductor current at the same instant and is compared with a non-zero reference value. The error between the sampled voltage and the reference value is integrated and provided as a state-variable to subsequent stages of the timing feedback controller. In order to achieve zero-voltage-switching on the "rising" transition, the power inductor is charged with some "negative current," so that it will in-turn charge the switching node voltage up to the input voltage (so that the source-to-drain voltage across the high-side power-FET at the instant when it closes is zero with 'Vin' at source and 'Vin' at drain). The reference value used in the third "sample and hold" circuit is selected so that the inductor current at the instant that the low-side power-FET opens is adequate to charge the switching node (aka half-bridge node). The integrated error signal generated by the third "sample and hold" circuit is passed to a frequency controller that determines the power converter switching frequency. If the third "sample and hold" circuit determines that the inductor current at the instant that the low-side power-FET opens is too low, its integrated output induces a reduction in the power converter switching frequency, which allows for additional time to charge the inductor and achieve zero-voltage-switching. Conversely, if the inductor current is too large (and negative) at the instant that the low-side power-FET opens, the timing control feedback circuitry increases the power converter switching frequency.

This combination of feedback control loops provides a general condition of zero-voltage-switching for both "rising" and "falling" transitions in an integrated power converter with arbitrary load current and input and output voltages.

Figure 1:
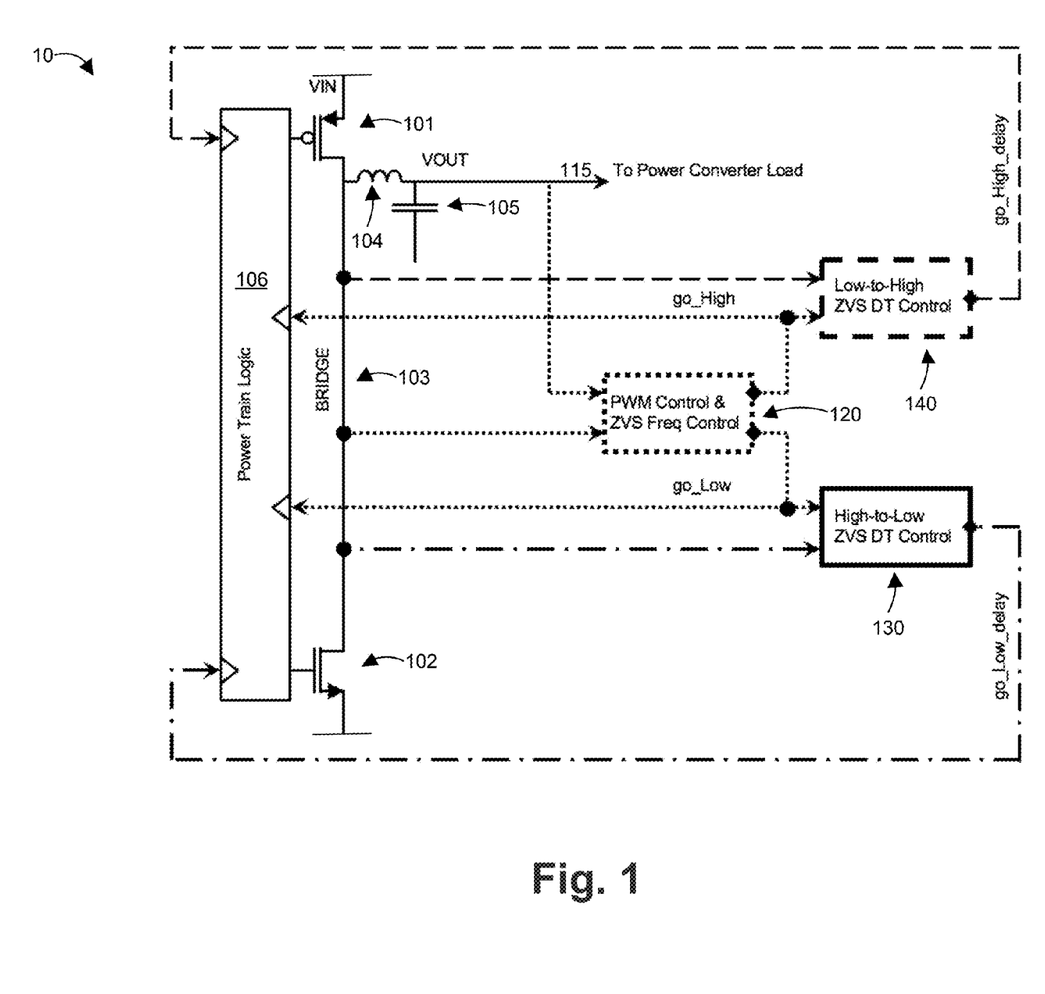
FIG. 1 is a block diagram of a switched-mode power converter 10 according to one or more embodiments.

FIG. 1 is a block diagram of a switched-mode power converter 10 according to an embodiment. The power converter 10 includes a PFET 101 and a NFET 102 electrically connected to a bridge node 103. The source side of the PFET 101 is electrically connected to an input voltage Vin. The depletion side of the PFET 101 is electrically connected to bridge 103. The source side of the NFET 102 is electrically connected to ground. The depletion side of the NFET 102 is electrically connected to bridge 103. In some embodiments, the depletion side of the NFET 102 can be connected to a low-voltage source having a voltage lower than Vin. The bridge 103 is electrically connected to an inductor 104 and a capacitor 105 that forms an LC circuit 110. The output of the LC circuit 110 has an output voltage Vout, which has a lower voltage than the input voltage Vin. A load 115 is electrically connected to the LC circuit 110, which operates at Vout. The inductor 104 can be the magnetic core inductor described in U.S. patent application Ser. No. 13/609,391, filed on Sep. 11, 2012, entitled "Magnetic Core Inductor Integrated with Multilevel Network," which is hereby incorporated by reference.

Power train logic 106 is electrically connected to PFET 101 and NFET 102. Power train logic 106 includes logic to prevent the PFET 101 and NFET 102 switches from closing simultaneously, which would create an electrical short from Vin to ground. The logic 106 also controls the timing of when the PFET 101 and NFET 102 switches open and close, and ensures that both PFET and NFET are not closed simultaneously.

The power converter 10 includes feedback and control circuits 120, 130, and 140. PWM and frequency control circuit 120 is configured to control the ratio of on and off times of PFET 101 and NFET 102 switches to obtain the desired output voltage Vout. The circuit 120 is also configured to control the switching frequency of the PFET 101 and NFET 102 so that the voltage across bridge node 103 (Vbridge) is equal to a reference voltage at the moment when the NFET 102 switch opens, as discussed below. As illustrated, a first input to the PWM and frequency control circuit 120 is electrically connected to the output of the power converter 10, which is at the output voltage Vout. A second input to the PWM and frequency control circuit 120 is electrically connected to bridge 103, which is at the bridge voltage Vbridge. A first output of circuit 120 is electrically connected to an input of circuit 140 and to power train logic 106. The first output of circuit 120 includes a go_high signal that represents the frequency and length of time for the power train logic 106 to switch on PFET 101. A second output of circuit 120 is electrically connected to an input of circuit 130. The second output of circuit 120 includes a go_low signal that represents the frequency and length of time for the power train logic 106 to switch on NFET 102. The ratio of the length of time that the PFET 101 and NFET 102 are switched on corresponds to an effective duty cycle to provide the target bridge voltage Vbridge.

Low-to-high delay control circuit 140 is configured to control a delay time between the moment when the NFET 102 switch opens (i.e., when the switch is off) and the moment when the PFET 101 switch closes (i.e., when the switch is on). The low-to-high delay time is selected so that Vbridge is equal to Vin when the PFET 101 switch closes, which provides for zero-voltage switching. As illustrated, a first input to circuit 140 is electrically connected to the first output of circuit 120, which includes the go_high signal. A second input to circuit 140 is electrically connected to bridge 103. An output of circuit 140 is electrically connected to power train logic 106. The output of circuit 140 provides a go_high_delay feedback signal to power train logic 106, as further discussed below.

High-to-low delay control circuit 130 is configured to control a delay time between the moment when the PFET 101 switch opens (i.e., when the switch is off) and the moment when the NFET 102 switch closes (i.e., when the switch is on). The high-to-low delay time is selected so that Vbridge is equal to ground (or to a low voltage if a low-voltage source is connected to NFET 102, as discussed above) when the NFET 102 switch closes, which provides for zero-voltage switching. As illustrated, a first input to circuit 130 is electrically connected to the second output of circuit 120 which includes the go_low signal. A second input to circuit 130 is electrically connected to bridge 103. An output of circuit 130 is electrically connected to power train logic 106. The output of circuit 130 provides a go_low_delay feedback signal to power train logic 106, as further discussed below.

Figure 2:
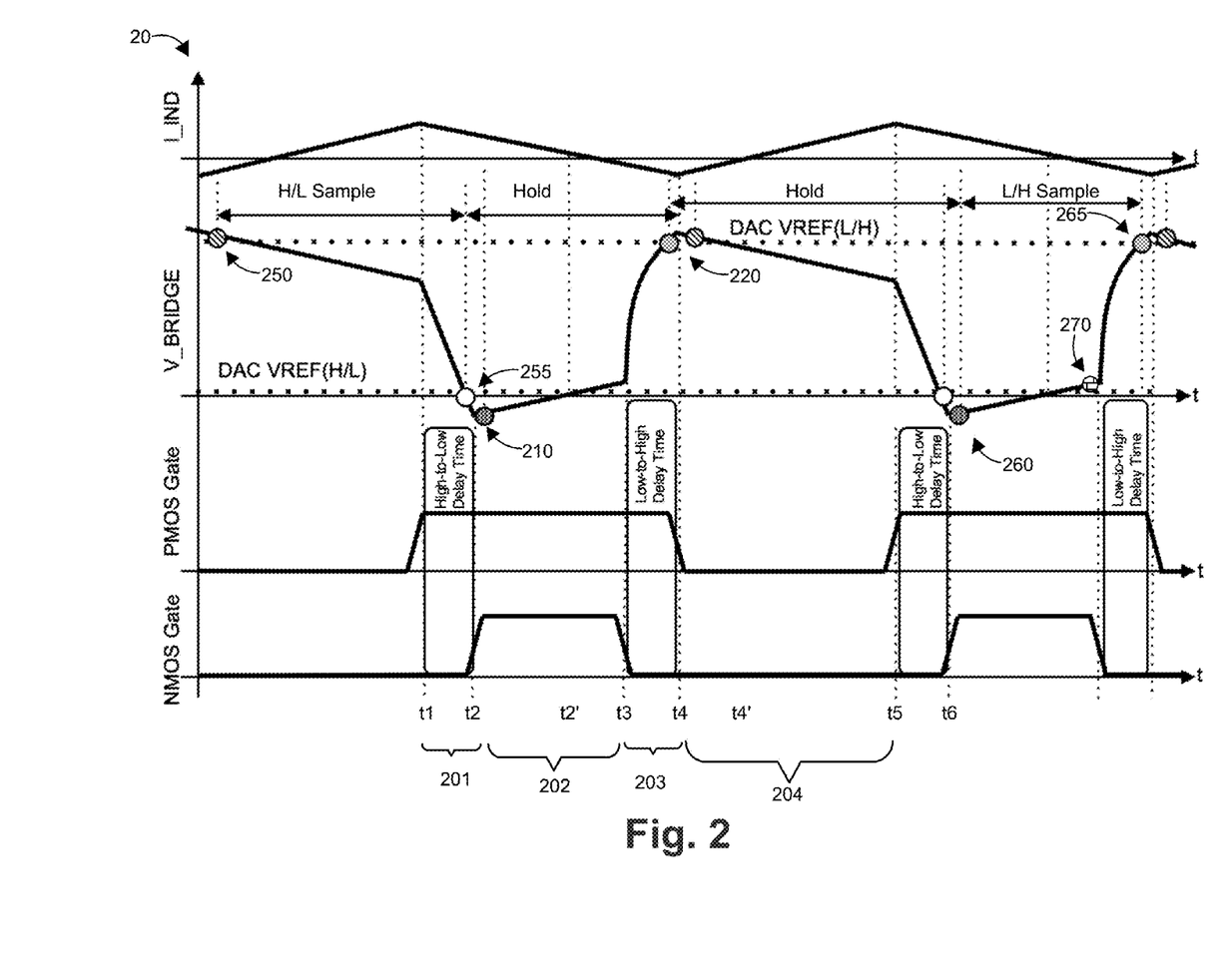
FIG. 2 is a timing diagram that illustrates the functionality of certain components of the power converter from FIG. 1.

FIG. 2 is a timing diagram 20 that illustrates the functionality of certain components of the power converter 10 from FIG. 1. The timing diagram 20 overlays the current (I_ind_ flowing through inductor 104, the bridge voltage (Vbridge), and the respective voltage across PFET 101 and NFET 102. At time t1, the voltage at PFET 101 is high, which indicates that the PFET 101 switch has opened and the switch is off. As can be seen in FIG. 2, the PFET 101 switch was on or closed during the time immediately preceding t1, indicating that the power converter 10 was in the "high" state just before t1. Also at t1, the voltage at NFET 102 is low, which indicates that the NFET 102 switch has opened and the switch is off. Thus, both the PFET 101 and the NFET 102 switches are open or off at t1. At time t2, PFET 101 remains off and NFET 102 turns on, which indicates that the power converter 10 has transitioned to the "low" state at t2. Thus, the time from t1 to t2 represents a delay time during which the power converter 10 transitions from the high to the low voltage state. This is an example of the go_low_delay time, discussed above, for which there is a go_low_delay feedback signal in FIG. 1.

During the high-to-low delay 201 from t1 to t2, both the PFET 101 and the NFET 102 switches are open. Since no current is flowing from PFET 101 to the LC circuit 110, the LC circuit 115 begins to discharge the energy stored in the inductor 104 and capacitor 105 to the load 115. This is represented in the timing diagram 20 by the decreasing inductor current I_ind and bridge voltage Vbridge. At t2, Vbridge reaches a minimum value 210, which corresponds to the voltage on the depletion side of NFET 102. Also illustrated in FIG. 2 is a high-to-low reference voltage, which is used by feedback and control circuit 130 to adjust the high-to-low delay 201 time. In the example of FIG. 1, the depletion side of NFET 102 is electrically connected to ground. Thus, when NFET 102 turns on at t2, the bridge voltage Vbridge and the depletion side of NFET 102 are at the same voltage (i.e., zero or ground). This is an example of high-to-low zero-voltage switching.

During the time period from t2 to t3 (i.e., time period 202), the NFET 102 is on and the PFET 101 is off. In other words, the bridge node 103 is electrically connected to ground during time period 202. As illustrated in FIG. 2, the inductor 104 continues to discharge current to the load 115 during time period 202. As a result of the current flowing to the load 115, the bridge voltage Vbridge increases. At time t2', which is between t2 and t3, the voltage at the inductor 104 falls below Vout, which causes the inductor current I_ind to change polarity and flow toward the bridge node 103. The capacitor 105 discharges from t2' to t3 to maintain the output voltage of the power converter 10 at Vout. At time t3, the NFET 102 turns off. In the low state, as the NFET 102 remains ON for an extended period of time, the inductor 104 current continues to discharge and the net current level changes from positive to negative, i.e. the inductor current changes polarity. In this cross-over state (between t2' and t3), the capacitor 105 supplies charge to both the load 115 and the negative inductor current.

During the low-to-high delay 203 from t3 to t4, both the PFET 101 and NFET 102 switches are open (i.e., the PFET 101 and NFET 102 switches are off). Since the bridge 103 is not electrically connected to ground during time period 203, the current flowing through inductor 104 causes the bridge voltage Vbridge to increase, as illustrated in FIG. 2. At the end of time period 203 (i.e., at t4), Vbridge reaches a maximum value 220, which corresponds to the voltage on the source side of PFET 101. Also illustrated in FIG. 2 is a low-to-high reference voltage, which is used by feedback and control circuit 140 to adjust the low-to-high delay 203 time. In the example of FIG. 1, the source side of PFET 101 is electrically connected to an input having input voltage Vin. Thus, when the PFET 101 turns on at t4, the bridge voltage Vbridge and the source side of PFET 101 are at the same voltage (i.e., Vin). This is an example of low-to-high zero-voltage switching.

During the time period from t4 to t5 (i.e., time period 204), the PFET 101 is on and the NFET 102 is off. In other words, the bridge node 103 is electrically connected to Vin during time period 204. As illustrated in FIG. 2, the inductor 104 (and capacitor 105) charges during time period 204, which causes the bridge voltage Vbridge to decrease. From time t4' to t5, the inductor 104 is charged sufficiently so the inductor current I_ind changes polarity and flows back towards the load 115. At t5, the bridge voltage Vbridge has reached a minimum voltage 230 at which time PFET 101 turns off. After t5, the cycle returns to high-to-low delay 201 as discussed above.

As will be appreciated, the settings and parameters of the voltage converter 10 may need to be adjusted and/or fine-tuned to allow for zero-voltage switching, as discussed above. The settings and parameters can include the length of high-to-low delay 201, the length of low-to-high delay 203, and the starting bridge voltage Vbridge at t3 (i.e., when NFET 102 opens and at the start of low-to-high delay 203). Other settings and parameters that can be adjusted and/or fine-tuned are described herein.

Figure 3:
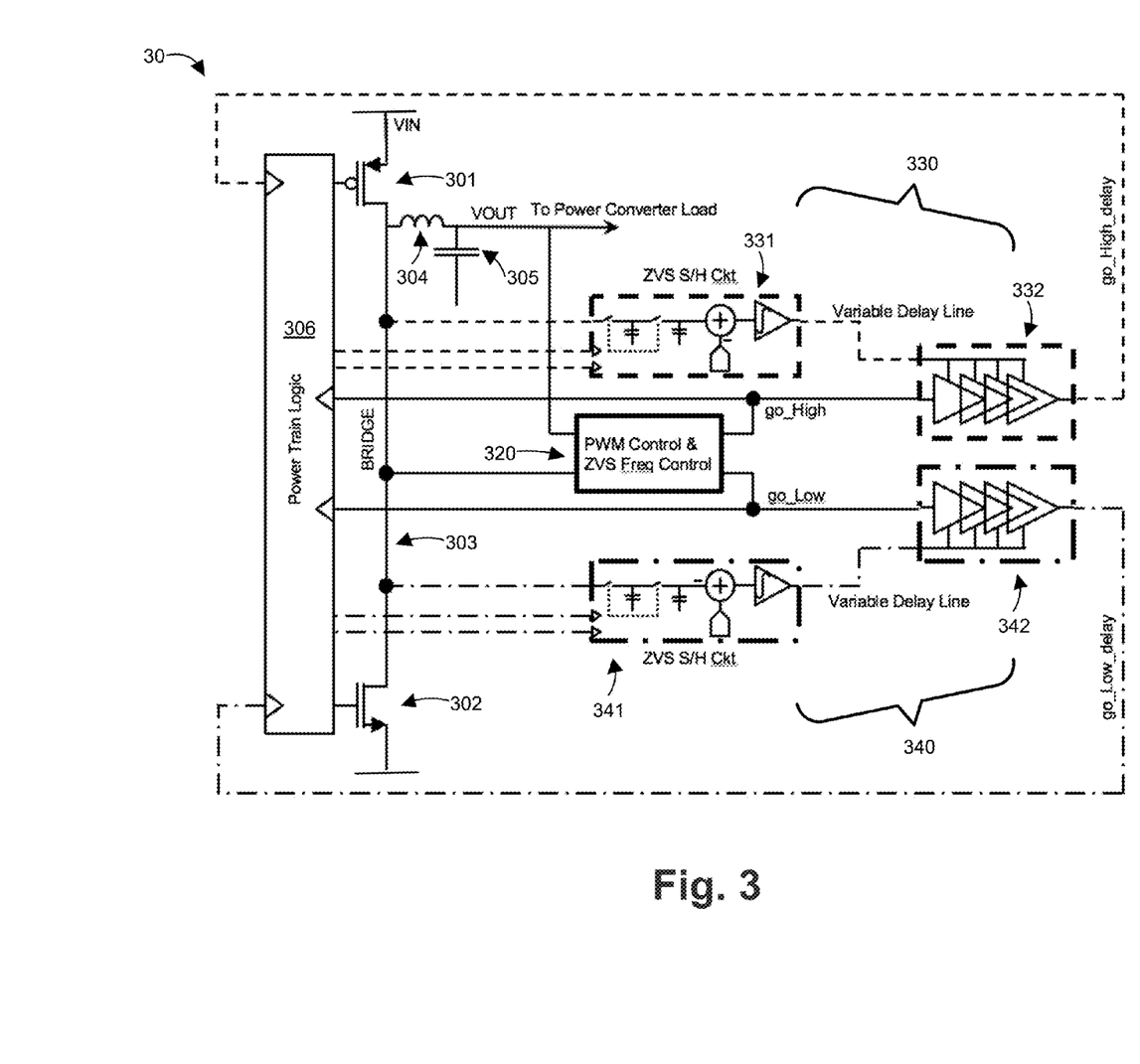
FIG. 3 is a block diagram of a switched-mode power converter according to one or more embodiments.

FIG. 3 is a block diagram of a switched-mode power converter 30 according to an embodiment. The power converter 30 in FIG. 3 is a more detailed view of the power converter 10 in FIG. 1 according to an embodiment. The power converter 30 includes a PFET 301 and a NFET 302 electrically connected to a bridge node 303. The source side of the PFET 301 is electrically connected to an input voltage Vin. The depletion side of the PFET 301 is electrically connected to bridge 303. The source side of the NFET 302 is electrically connected bridge 303. The depletion side of the NFET 302 is electrically connected to ground. In some embodiments, the depletion side of the NFET 302 can be connected to a low-voltage source having a voltage lower than Vin. The bridge 303 is electrically connected to an inductor 304 and a capacitor 305 that forms an LC circuit 310. The output of the LC circuit 310 has an output voltage Vout, which has a lower voltage than the input voltage Vin. A load 315 is electrically connected to the LC circuit 310, which operates at Vout.

Power train logic 306 is electrically connected to PFET 301 and NFET 302. Power train logic 306 includes logic to prevent the PFET 301 and NFET 302 switches from closing simultaneously, which would create an electrical short from Vin to ground. The logic 306 also controls the timing of when the PFET 301 and NFET 302 switches open and close.

The power converter 30 includes feedback and control circuits 320, 330, and 340. PWM and frequency control circuit 320 is configured to control the ratio of on and off times of PFET 301 and NFET 302 switches to obtain the desired output voltage Vout. The circuit 320 is also configured to control the switching frequency of the PFET 301 and NFET 302 so that the voltage across bridge node 303 (Vbridge) is equal to a reference voltage at the moment when the NFET 302 switch opens, as discussed herein. The inputs of circuit 320 are electrically connected to Vout and to bridge node 303 (i.e., Vbridge). The outputs of circuit 320 provide a go_high signal and a go_low signal, which are fed back to power train logic 306 and are fed forward to feedback and control circuits 330 and 340, respectively.

Feedback and control circuit 330 includes a zero-voltage-switching sample and hold (ZVS S/H) circuit 331 and a variable delay circuit 332. The input of the ZVS S/H circuit 331 is electrically connected to bridge 303 and to power train logic 306. An output of ZVS S/H circuit 331 is electrically connected to an input of variable delay circuit 332. The go_high output of PWM and frequency control circuit 320 is electrically connected to an input of variable delay circuit 332. The output of variable delay circuit 332 is electrically connected to power train logic 306.

Feedback and control circuit 340 includes a zero-voltage-switching sample and hold (ZVS S/H) circuit 341 and a variable delay circuit 342. The input of the ZVS S/H circuit 341 is electrically connected to bridge 303 and to power train logic 306. An output of ZVS S/H circuit 341 is electrically connected to an input of variable delay circuit 342. The go_low output of PWM and frequency control circuit 320 is electrically connected to an input of variable delay circuit 342. The output of variable delay circuit 342 is electrically connected to power train logic 306.

Figure 4:
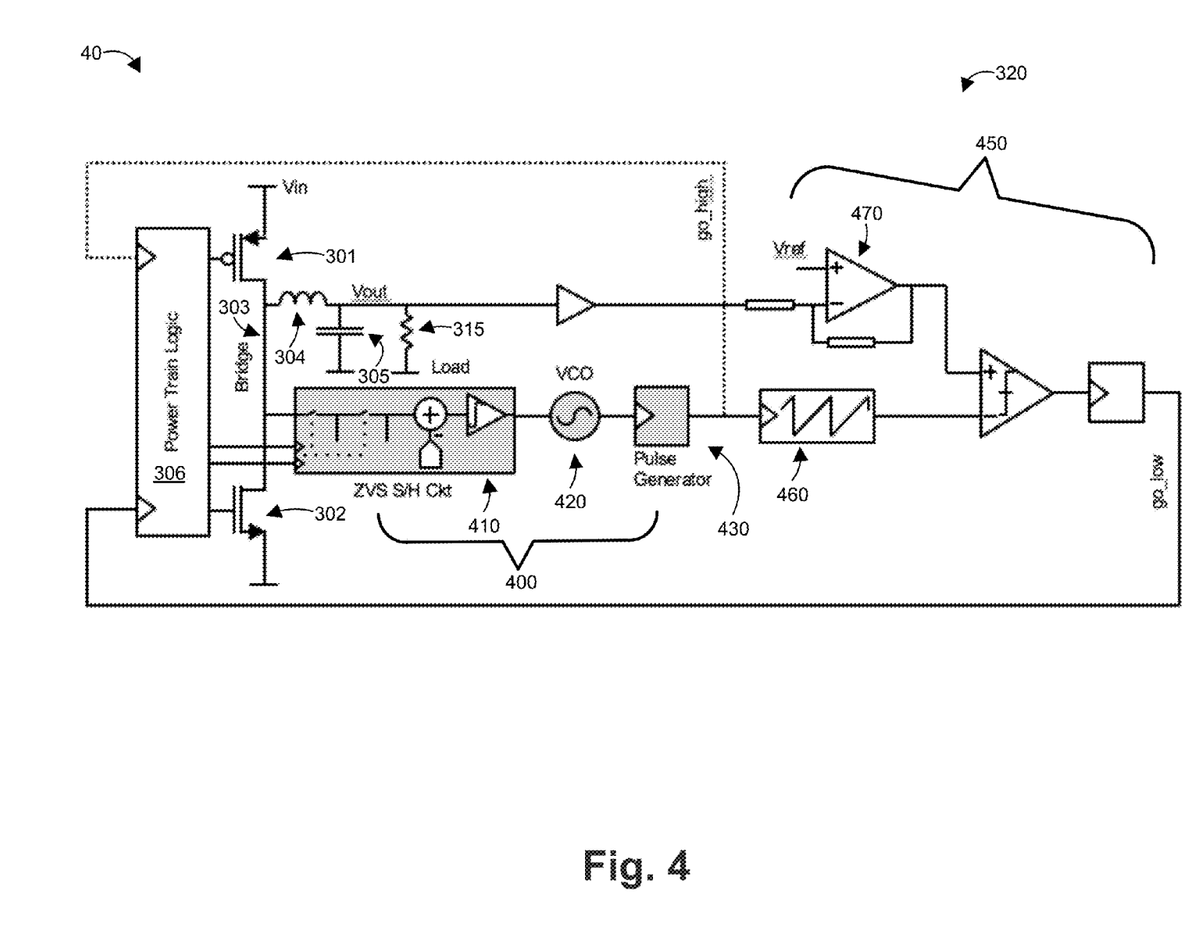
FIG. 4 is a block diagram of the PWM and frequency control circuit illustrated in FIG. 3.

FIG. 4 is a block diagram 40 of the PWM and frequency control circuit 320 illustrated in FIG. 3. The PWM and frequency control circuit 320 includes a frequency control circuit 400 and a PWM control circuit 450. The frequency control circuit 400 includes a ZVS S/H circuit 410, a voltage-controlled oscillator (VCO) 420, and a pulse generator 430. Inputs of the ZVS S/H circuit 410 are in electrical communication with bridge 303 and power train logic 306. The output of the ZVS S/H circuit 410 is in electrical communication with the input of VCO 420. The output of VCO 420 is in electrical communication with the input of pulse generator 430. The output of pulse generator 430 is in electrical communication with an input of PWM control circuit 450.

ZVS S/H circuit 410 measures the source-to-drain voltage across NFET 302 at the instant when the NFET 302 opens (i.e., when PFET 301 switch closes). ZVS S/H circuit 410 compares the sampled voltage with a reference voltage Vref_inductor. The difference or error between the sampled and reference voltages is integrated in ZVS S/H circuit 410, and the integrated error signal is output to VCO 420. The reference voltage Vref_inductor is selected so that the inductor 304 current at the instant that the NFET 302 opens is adequate to charge bridge node 303 up to the input voltage Vin on the source side of PFET 301, as discussed above with respect to FIG. 2 (i.e., during time period 203). If the difference between the sampled and reference voltages is negative (i.e., the sampled voltage is lower than the reference voltage), this indicates that the inductor 304 current is too low and the inductor 304 needs additional time to charge (i.e., during time period 204 when PFET 301 is closed). In that scenario, the integrated output of ZVS S/H 410 causes the VCO 420 to generate oscillations at a lower frequency. Conversely, if the difference between the sampled and reference voltages is positive (i.e., the sampled voltage is higher than the reference voltage), this indicates that the inductor 304 current is too high and the inductor 304 is over charged. In that scenario, the integrated output of ZVS S/H 410 causes the VCO 420 to generate oscillations at a higher frequency. If the difference between the sampled and reference voltages is zero, the integrated output of ZVS S/H 410 does not cause the VCO 420 to change frequency. In some embodiments, VCO 420 operates at about 100 KHz (or less) to about 500 MHz, including about 1 MHz, about 50 MHz, about 100 MHz, about 200 MHz, about 300 MHz, about 400 MHz, or any value or range between any two of the foregoing values.

The pulse generator 430 transforms the waveform output from VCO 420 into a triangular waveform as indicated in block 460 of PWM control circuit 450. The output of pulse generator 430 is also in electrical communication with an input of power train logic 306, which controls the switching frequency of the power converter. An increase or decrease in the switching frequency from frequency control circuit 400 causes the power train logic 306 to make a corresponding increase or decrease in the switching frequency of PFET 301. The feedback signal to powertrain logic 306 is referred to as a go_high signal.

The PWM control circuit 450 receives as inputs the output voltage Vout of the power converter, a reference voltage Vref_out, and the switching frequency waveform output from frequency control circuit 400. The PWM control circuit 450 compares Vout with Vref with comparator 470 and combines the error or difference with the triangular waveform output from frequency control circuit 400. The combined signal is output from PWM control circuit 450 to an input of powertrain logic 306. This feedback signal (referred to as a go_low signal) is used by powertrain logic 306 to adjust the duty cycle or relative "on" times of the PFET 301 and NFET 302 switches. By adjusting this duty cycle, the PWM control circuit 450 indirectly controls the output voltage Vout. If Vout is below Vref, the go_low signal decreases the on time of NFET 302. If Vout is above Vref, the go_low signal increases the on time of NFET 302. Vref_out can be selected to be equal to a target voltage, such as the target Vout voltage. In some embodiments, the target voltage can be an arbitrary target voltage.

Figure 5:
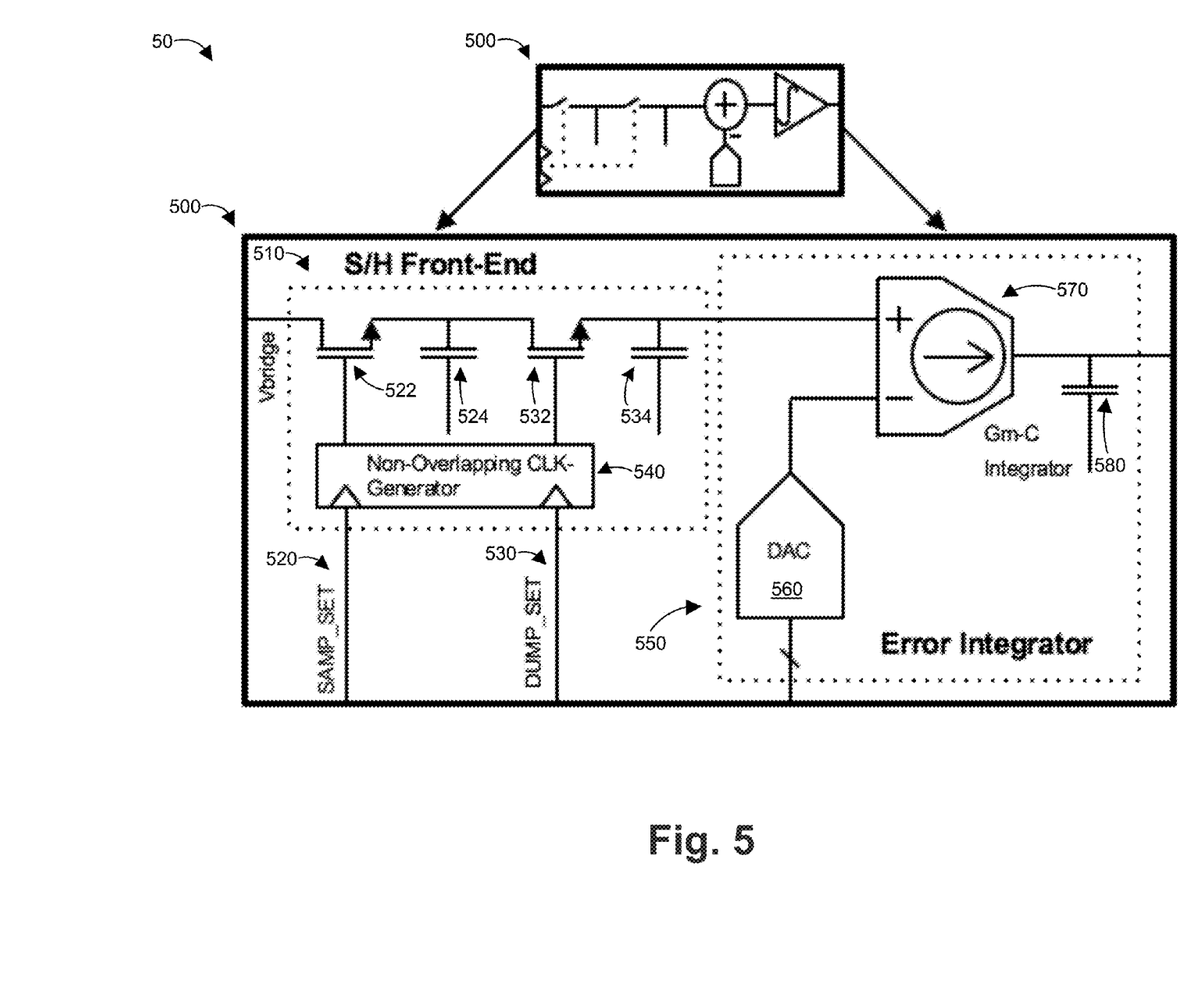
FIG. 5 is a detailed view of a zero-voltage-switching sample and hold circuit according to one or more embodiments.

FIG. 5 is a detailed view 50 of a ZVS S/H circuit 500 according to an embodiment. The ZVS S/H circuit 500 can be the same as ZVS S/H circuits 331, 341, and/or 410. The circuit 500 includes a front end 510 and an error integrator 550. The front end 510 receives as inputs Vbridge, SAMP_SET 520, and DUMP_SET 530. The SAMP_SET and DUMP_SET signals are pulses derived in the power train logic from go_high, go_low, go_high_delay, and go_low_delay. The SAMP_SET and DUMP_SET drive the non-overlapping clock generator to create sample and dump clocks for the sample and dump FET switches in the S/H front-end. SAMP_SET 520 is in electrical communication with a first NFET 522 via non-overlapping clock generator 540. Likewise, DUMP_SET 530 is in electrical communication with a second NFET 532 via non-overlapping clock generator 540 As is common in sample-and-hold systems, or sampled systems, non-overlapping clocks are used to avoid finite charge re-distribution during the transition from the sample phase to the hold phase, and vice-versa. At the end of a given sampling period (e.g., at the end of time period 201, 202, or 203), the first NFET 522 opens at which time SAMP_SET 520 is electrically connected to sampling capacitor 524, which holds the sampled source-to-drain voltage from the sampled power-FET (i.e., NFET or PFET). The sampled source-to-drain voltage held on sampling capacitor 524 is proportional to the current that was travelling through the power-FET during the switch transition according to Ohm's law. In some embodiments, first NFET 522, sampling capacitor 524, and second NFET 532 form a switched-capacitor resistor.

The error integrator 550 receives as inputs the sampled source-to-drain voltage from front end 510 and a digital signal that represents a reference voltage. The reference voltage varies depending on the location of the ZVS S/H circuit 500 in the power converter. For the ZVS S/H circuit 410 in PWM and frequency control circuit 320 (FIG. 4), the reference voltage (Vref_inductor) is selected so that the inductor 304 current at the instant that the NFET 302 opens is adequate to charge bridge node 303 up to the input voltage Vin on the source side of PFET 301, as discussed above. For the ZVS S/H circuit 331 (FIG. 3), the reference voltage (Vref_high) is the input voltage Vin. For the ZVS S/H circuit 341 (FIG. 3), the reference voltage (Vref_low) is ground.

The error integrator 550 includes a digital-to-analog converter (DAC) 560 an integrator 570, and a capacitor 580. DAC 560 converts the digital signal input to the respective reference voltage discussed above. The integrator 570 receives as inputs the output of DAC 560 (i.e., the respective reference voltage) and the output of front end 510 (i.e., the respective sampled source-to-drain voltage). The integrator 570 determines the error between the respective sampled and reference voltages and outputs an integrated error signal that contains this information. In some embodiments, the integrator 570 is a Gm-C integrator, as illustrated in FIG. 5, though this is not a limitation.

Returning to FIG. 3, variable delay circuit 332 receives as inputs the output of ZVS S/H circuit 331 (integrated error signal with respect to Vref_high) and the output of PWM and frequency control circuit 320 (go_high feedback signal). The variable delay circuit 332 processes these inputs and outputs a go_high_delay signal that represents the delay time between when the NFET 302 switches off and when the PFET 301 switches on (i.e., low-to-high delay 203 in FIG. 2). In some embodiments, the go_high_delay signal is inversely proportional to the requested delay time. The variable delay circuit 332 can include a plurality of buffers and/or a plurality of current-starved inverters, though this is not a requirement. The go_high_delay signal is sent from variable delay circuit 332 to power train logic 306, which adjusts the low-to-high delay time 203 accordingly. If PFET 301 switches on too early, Vbridge will be less than Vin because inductor 304 did not have enough time to charge Vbridge. Since Vbridge is not equal to Vin at the end of low-to-high delay 203, there will not be a low-to-high zero-voltage switch. In that case, the ZVS S/H circuit 331 outputs an integrated error signal to indicate that the low-to-high delay time needs to be increased. If PFET 301 switches on too late, Vbridge will be greater than Vin because inductor 304 overcharged Vbridge. Since Vbridge is not equal to Vin, there will not be a low-to-high zero-voltage switch. In that case, the ZVS S/H circuit 331 outputs an integrated error signal to indicate that the low-to-high delay time needs to be decreased.

Variable delay circuit 342 receives as inputs the output of ZVS S/H circuit 341 (integrated error signal with respect to Vref_low) and the output of PWM and frequency control circuit 320 (go_low feedback signal). The variable delay circuit 342 processes these inputs and outputs a go_low_delay signal that represents the delay time between when the PFET 301 switches off and when the NFET 302 switches on (i.e., high-to-low delay 201 in FIG. 2). In some embodiments, the go_low_delay signal is inversely proportional to the requested delay time. The variable delay circuit 342 can include a plurality of buffers and/or a plurality of current-starved inverters, though this is not a requirement. The go_low_delay signal is sent from variable delay circuit 342 to power train logic 306, which adjusts the high-to-low delay time 201 accordingly. If NFET 302 switches on too early, Vbridge will be greater than ground (or a target low voltage) because Vbridge did not have enough time to discharge through inductor 304. Since Vbridge is not equal to ground at the end of the high-to-low delay 201, there will not be a high-to-low zero-voltage switch. In that case, the ZVS S/H circuit 341 outputs an integrated error signal to indicate that the high-to-low delay time needs to be increased. If NFET 302 switches on too late, Vbridge will be lower than ground because Vbridge had too much time to discharge through inductor 304. Since Vbridge is not equal to ground, there will not be a high-to-low delay zero-voltage switch. In that case, the ZVS S/H circuit 331 outputs an integrated error signal to indicate that the high-to-low delay time needs to be decreased.

Returning to FIG. 2, the "dots" on the Vbridge graph correspond to the time at which the ZVS S/H circuits take their respective samples of Vbridge. For example, dot 250 corresponds to the start time and corresponding V_bridge of a high-to-low sample. Dot 255 corresponds to the end time and corresponding V_bridge of the high-to-low sample. Dot 260 corresponds to the start time and corresponding V_bridge of a low-to-high sample. Dot 265 corresponds to the end time and corresponding V_bridge of the low-to-high sample. Dot 260 also corresponds to the start time and corresponding V_bridge of the sample for the PWM and frequency control circuit. Dot 270 corresponds to the end time and corresponding V_bridge of the sample for the PWM and frequency control circuit.

Figure 6:
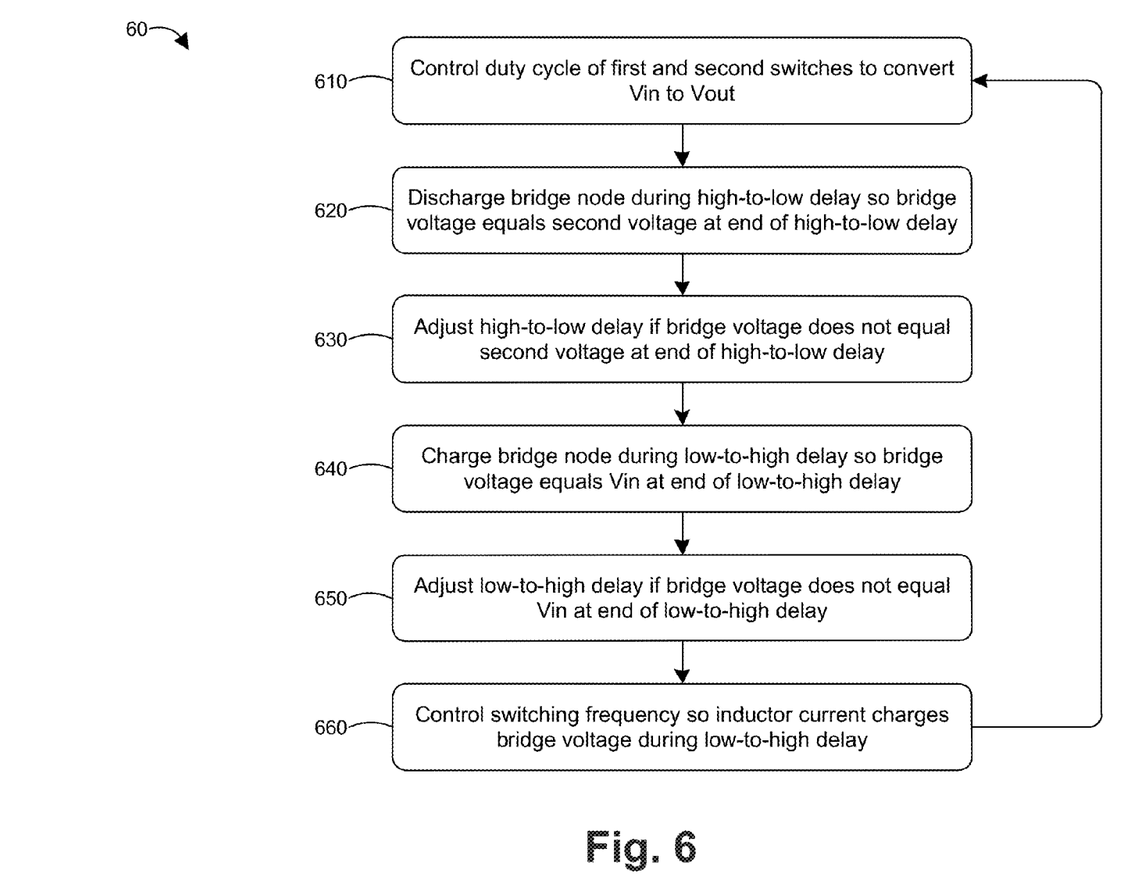
FIG. 6 is a flow chart of a method of operating a switch-mode power converter according to one or more embodiments.

FIG. 6 is a flow chart 60 of a method of operating a switch-mode power converter according to an embodiment. In step 610, the duty cycle (i.e., relative "on" times") of the first and second switch is controlled to convert the input voltage, Vin, to a desired output voltage, Vout, to a load. In step 620, the bridge node is discharged during the high-to-low delay time (i.e., the time between opening the first switch and closing the second switch) so that the bridge voltage equals the second voltage at the end of the high-to-low delay time, the second voltage electrically coupled to the second switch. In step 630, the high-to-low delay time is adjusted if the bridge voltage does not equal the second voltage at the end of the high-to-low delay time, as discussed above. In step 640, the bridge node is charged during the low-to-high delay time (i.e., the time between opening the second switch and closing the first switch) so that the bridge voltage equals the power converter input voltage at the end of the low-to-high delay time, the power converter input voltage electrically coupled to the first switch. In step 650, the low-to-high delay time is adjusted if the bridge voltage does not equal the power converter input voltage at the end of the low-to-high delay time, as discussed above. In step 660, the switching frequency is controlled so the inductor is charged with sufficient current to increase the bridge voltage to the power converter input voltage during the low-to-high delay time. The flow chart 60 iteratively repeats.

As will now be appreciated, this disclosure provides various embodiments of systems and methods for zero-voltage switching of a switch-mode power converter. The high-to-low delay time between switching off or opening the high-voltage switch and switching on or closing the low-voltage switch is adjusted so that the bridge voltage is equal (or approximately equal) to the low-voltage source electrically coupled to the low-voltage switch. In some embodiments, the low-voltage source is ground. When the bridge voltage is equal (or approximately equal) to the low-voltage source, there is zero (or approximately zero) voltage across the low-voltage switch when the low-voltage switch turns on or closes. The low-to-high delay time between switching off or opening the low-voltage switch and switching on or closing the high-voltage switch is adjusted so that the bridge voltage is equal (or approximately equal) to the power supply input voltage Vin electrically coupled to the low-voltage switch. The frequency of the power converter is adjusted so that an inductor in an LC circuit in electrical communication with the bridge is sufficiently charged while the high-voltage switch is closed so that the inductor has enough energy to raise the bridge voltage to Vin during the low-to-high delay time.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A switch-mode power converter comprising:
   a bridge node having a bridge voltage;
   a first switch having a first input and a first output, the first input having a power converter input voltage, the first output electrically connected to the bridge node, the first switch having a closed state in which the first input is electrically connected to the first output and an open state in which the first input is not electrically connected to the first output;

a second switch having a second input and a second output, the second input electrically connected to the bridge node, the second output electrically connected to a second voltage, the second voltage lower than the power converter input voltage, the second switch having a closed state in which the second input is electrically connected to the second output and an open state in which the second input is not electrically connected to the second output;

a logic circuit in electrical communication with the first and second switches, the logic circuit controlling a respective state of the first and second switches such that the first switch is in the open state when the second switch is in the closed state and the second switch is in the open state when the first switch is in the closed state;

an LC circuit in electrical communication with the bridge node and a power converter load, the power converter load receiving an output current at a power converter output voltage, the power converter output voltage lower than the power converter input voltage;

a PWM and frequency control circuit configured to (a) control a ratio of times that the first and second switches are in respective closed states to control the power converter output voltage and (b) adjust a switching frequency of the first and second switches;

a first delay feedback circuit configured to control a low-to-high delay time between an open time of said second switch and a close time of said first switch; and a second delay feedback circuit configured to control a high-to-low delay time between an open time of said first switch and a close time of said second switch;

wherein said switching frequency defines a power conversion cycle of said switch-mode power converter, said first switch is in its closed state during a portion of the power conversion cycle, and said second switch is in its closed state during another portion of the same power conversion cycle; and wherein the PWM and frequency control circuit is configured to adjust said switching frequency of the first and second switches such that an inductor of the LC circuit is charged with sufficient current to raise the bridge voltage to the power converter input voltage during the low-to-high delay time.

2. The power converter of claim 1, wherein the first and second switches comprise transistors.

3. The power converter of claim 2, wherein the first switch comprises a PFET and the second switch comprises an NFET.

4. The power converter of claim 1, wherein the high-to-low-delay time is selected so that the bridge voltage is equal to the second voltage when the second switch transitions to the closed state.

5. The power converter of claim 1, wherein the low-to-high-delay time is selected so that the bridge voltage is equal to the power converter input voltage when the first switch transitions to the closed state.

6. The power converter of claim 1, wherein the first and second delay feedback circuits each include a sample and hold circuit and a variable delay circuit.

7. The power converter of claim 6, wherein the sample and hold circuit of the second delay feedback circuit (a) samples a second switch voltage across the second switch at the close time of the second switch and (b) determines an error between the second switch voltage and the second input voltage.

8. The power converter of claim 1, wherein the PWM and frequency control circuit includes a sample and hold circuit in electrical communication with the bridge node and a frequency controller.

9. The power converter of claim 8, wherein the sample and hold circuit of the PWM and frequency control circuit (a) samples a second open switch voltage across the second switch at the open time of the second switch and (b) determines an error between the second open switch voltage and a reference voltage, the reference voltage selected so that an inductor current of the LC circuit raises the bridge voltage to the power converter input voltage during the low-to-high-delay time.

10. The power converter of claim 9, wherein the frequency controller decreases the switching frequency of the first and second switches if the second open switch voltage is less than the reference voltage.

11. The power converter of claim 10, wherein the frequency controller increases the switching frequency of the first and second switches if the second open switch voltage is greater than the reference voltage.

12. The power converter of claim 10, wherein the frequency controller comprises a voltage controlled oscillator.

13. A method of operating a switch-mode power converter, the method comprising:

controlling a duty cycle of first and second switches electrically connected to a bridge node to convert a power converter input voltage to a power converter output voltage, wherein:

the first switch has a first input and a first output, the first input having a power converter input voltage, the first output electrically connected to a bridge node, the first switch having a closed state in which the first input is electrically connected to the first output and an open state in which the first input is not electrically connected to the first output, the second switch has a second input and a second output, the second input electrically connected to the bridge node, the second output electrically connected to a second voltage, the second voltage lower than the power converter input voltage, the second switch having a closed state in which the second input is electrically connected to the second output and an open state in which the second input is not electrically connected to the second output, and first switch is in the open state when the second switch is in the closed state and the second switch is in the open state when the first switch is in the closed state;

discharging the bridge node voltage during a high-to-low-delay time between an open time of the first switch and a close time of the second switch so that the bridge node voltage equals the second voltage at an end of the high-to-low-delay time;

adjusting the high-to-low-delay time if the bridge node voltage does not equal the second voltage at the end of the high-to-low-delay time;

charging the bridge node voltage during a low-to-high-delay time between an open time of the second switch and a close time of the first switch so that the bridge node voltage equals the power converter input voltage at an end of the low-to-high-delay time;

adjusting the low-to-high-delay time if the bridge node voltage does not equal the power converter input voltage at the end of the low-to-high-delay time; and adjusting a switching frequency of the first and second switches so that an inductor current of an LC circuit in electrical communication with the bridge node raises the bridge voltage to the power converter input voltage during the low-to-high-delay time;

wherein said switching frequency defines a power conversion cycle of said switch-mode power converter, said first switch is in its closed state during a portion of the power conversion cycle, and said second switch is in its closed state during another portion of the same power conversion cycle.

14. The method of claim 13, further comprising measuring the bridge voltage at the end of the high-to-low-delay time and determining an error between the measured bridge voltage and the second voltage.

15. The method of claim 14, further comprising increasing the high-to-low-delay time if the measured bridge node voltage is higher than the second voltage at the end of the high-to-low-delay time.

16. The method of claim 14, further comprising decreasing the high-to-low-delay time if the measured bridge node voltage is lower than the second voltage at the end of the high-to-low-delay time.

17. The method of claim 13, further comprising measuring the bridge voltage at the beginning of the low-to-high-delay time and comparing the measured bridge voltage to the reference voltage.

18. The method of claim 17, further comprising decreasing the switching frequency of the first and second switches if the measured bridge voltage is less than the reference voltage.

19. The method of claim 17, further comprising increasing the switching frequency of the first and second switches if the measured bridge voltage is greater than the reference voltage.

* * * * *